United States Patent
Aoki

(10) Patent No.: US 6,553,532 B1
(45) Date of Patent: Apr. 22, 2003

(54) METHOD AND APPARATUS FOR RECORDING AND REPRODUCING INFORMATION ON AND FROM DISK

(75) Inventor: Yoshito Aoki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/401,852

(22) Filed: Sep. 22, 1999

(30) Foreign Application Priority Data

Oct. 2, 1998 (JP) ............................................. 10-281715

(51) Int. Cl.[7] .............................................. G11C 29/00
(52) U.S. Cl. .................................... 714/763; 369/59.24
(58) Field of Search ........................... 714/763, 15, 24, 714/9, 805, 710, 769; 713/202, 340, 300; 711/103, 1, 6, 340, 162, 122; 707/200–202, 2–5, 100; 369/53.18, 47.34, 59.24, 30.1, 275.3; 360/51, 77.08

(56) References Cited

U.S. PATENT DOCUMENTS

| | | | | |
|---|---|---|---|---|
| 5,274,799 A | * | 12/1993 | Brant et al. ..................... | 714/6 |
| 5,343,455 A | | 8/1994 | Arai et al. ..................... | 369/59 |
| 5,720,025 A | * | 2/1998 | Wilkes et al. ................... | 714/6 |
| 5,761,406 A | | 6/1998 | Kobayashi et al. ............ | 714/24 |
| 5,799,145 A | * | 8/1998 | Imai et al. ................... | 713/202 |
| 6,101,576 A | * | 8/2000 | Kobayashi et al. .......... | 711/122 |
| 6,466,532 B1 | * | 10/2002 | Ko ............................. | 369/53.2 |

FOREIGN PATENT DOCUMENTS

| | | | |
|---|---|---|---|
| EP | 0 520 381 | 12/1992 | ......... G11B/27/034 |
| JP | 6-19767 | * 1/1994 | ........... G06F/12/00 |

* cited by examiner

Primary Examiner—Albert Decady
Assistant Examiner—Guy Lamarre
(74) Attorney, Agent, or Firm—Louis Woo

(57) ABSTRACT

Information is recorded on and reproduced from a disk ECC-block by ECC-block. Every ECC block is composed of plural sectors. A recording command is generated which contains information of a recording position on the disk. The information of the recording position is stored into a non-volatile memory. Data is recorded on the disk in response to the recording command. In cases where power supply is turned on after interruption of power supply terminates, a specified ECC block is detected from the information stored in the nonvolatile memory. The specified ECC block is adversely affected by the interruption of power supply during the recording of data on the disk. One of a reproducing command and a verify command is generated for at least one sector of the specified ECC block. Data is reproduced from the specified ECC block on the disk in response to the one of the reproducing command and the verify command. A decision is made as to whether or not the reproduction of data from the specified ECC block succeeds or fails. In cases where it is decided that the reproduction of data from the specified ECC block fails, data is recorded on a whole of the specified ECC block to convert the specified ECC block into a normal ECC block.

6 Claims, 11 Drawing Sheets

FIG. 4

| RECORDING NUMBER | NONVOLATILE MEMORY | |
|---|---|---|
| | START LBA | RECORDING SIZE |
| 1 | 500 | 20 |
| 2 | 385 | 15 |
| 3 | 150 | 50 |
| 4 | 600 | 10 |
| 5 | 610 | 20 |
| 6 | 630 | 200 |
| 7 | | |
| 8 | | |
| 9 | | |
| 10 | | |
| n | | |

FIG. 5

| INSPECTED ECC BLOCK RANGE | |
|---|---|
| FIRST (ECC0) | LAST (ECC1) |
| 496 | 512 |
| 384 | 384 |
| 144 | 192 |
| 592 | 608 |
| 608 | 624 |
| 624 | 816 |

FIG. 6

| ACCUMULATED RECORDING SIZE |
|---|
| 315 |
| 295 |
| 280 |
| 230 |
| 220 |
| 200 |

FIG. 7

| INSPECTED ECC BLOCK RANGE | |
|---|---|
| FIRST (ECC0) | LAST (ECC1) |
| — | — |
| — | — |
| 160 | 192 |
| 592 | 608 |
| 608 | 624 |
| 624 | 816 |

FIG. 13

| RECORDING NUMBER | NONVOLATILE MEMORY | |
|---|---|---|
| | START LBA | RECORDING SIZE |
| 1 | 8 | 65 |
| 2 | 385 | 15 |
| 3 | 150 | 50 |
| 4 | 600 | 10 |
| 5 | 610 | 20 |
| 6 | 630 | 200 |
| 7 | | |
| 8 | | |
| 9 | | |
| 10 | | |
| n | | |

FIG. 14

| RECORDING DATA RANGE | |
|---|---|
| START (LBA0) | END (LBA1) |
| 8 | 72 |
| 385 | 399 |
| 150 | 199 |
| 600 | 609 |
| 610 | 629 |
| 630 | 829 |

FIG. 15

| EXISTING DATA RANGE (FIRST) | | EXISTING DATA RANGE (LAST) | |
|---|---|---|---|
| START (ECC0) | END (LBA0−1) | START (LBA+1) | END (ECC2) |
| 0 | 7 | 73 | 79 |
| 384 | 384 | 399 | 399 |
| 144 | 149 | 200 | 207 |
| 592 | 599 | 610 | 623 |
| 608 | 609 | 630 | 639 |
| 624 | 629 | 830 | 831 |

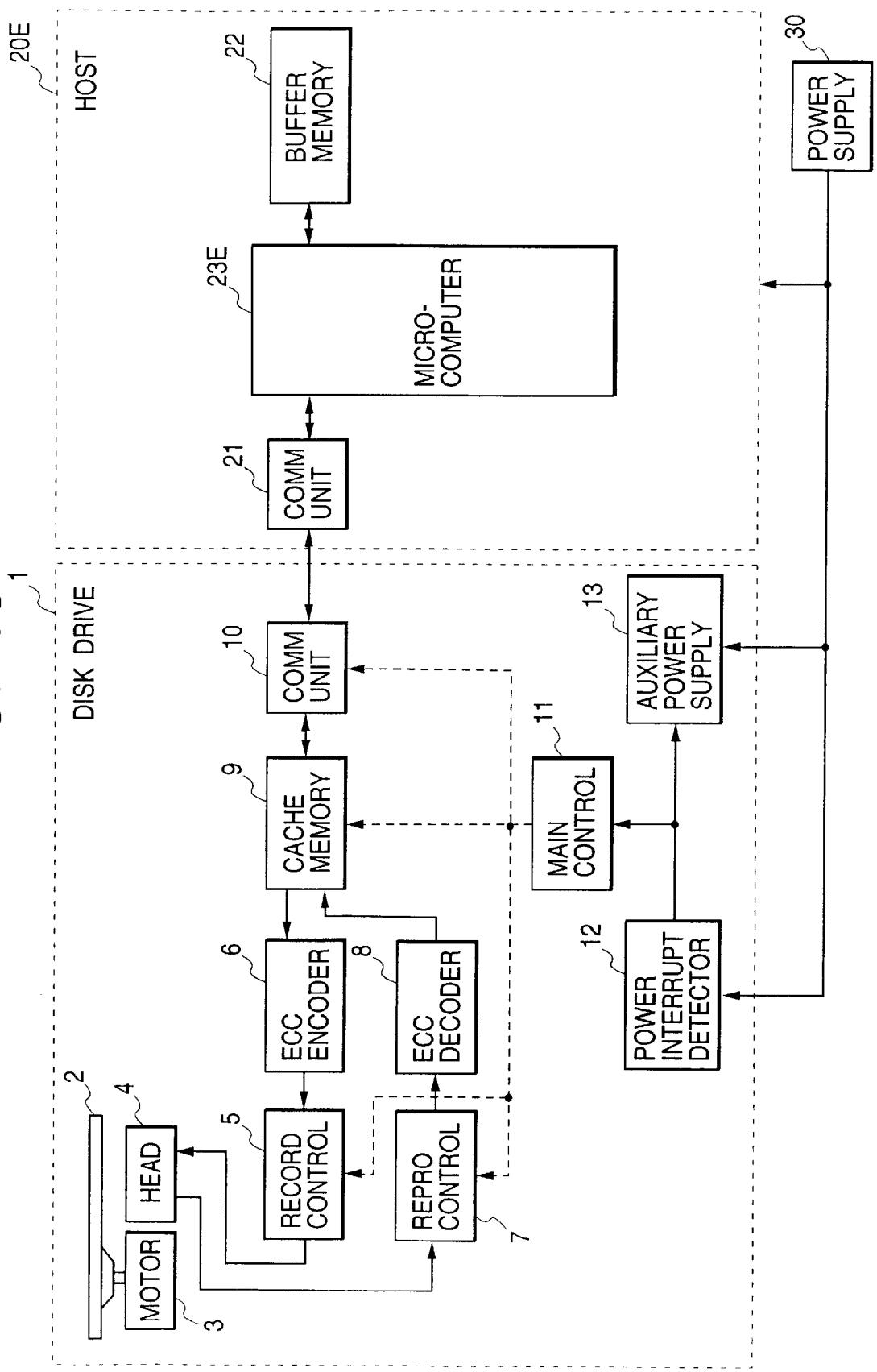

METHOD AND APPARATUS FOR RECORDING AND REPRODUCING INFORMATION ON AND FROM DISK

BACKGROUND OF THE INVENTION

1. Field of the Invention

This invention relates to a method of recording and reproducing information on and from a disk-shaped recording medium such as an optical disk, a magnetic disk, or a magneto-optical disk. This invention also relates to an apparatus for recording and reproducing information on and from a disk-shaped recording medium such as an optical disk, a magnetic disk, or a magneto-optical disk.

2. Description of the Related Art

Japanese published unexamined patent application 6-19767 discloses a magnetic disk controller with a file restoration function. The magnetic disk controller in Japanese patent application 6-19767 includes an output control means, an output data storage means, an output control information storage means, an output state storage means, and a file restoration means. The output data storage means stores data to be outputted to the magnetic disk which is fed from a host device. The output data storage means can hold the data even when power supply is interrupted. The output control means is informed by the host device of a designated output position and an output-data length. The output control means writes the information of the designated output position and the output-data length into the output control information storage means. The output control information storage means can hold the information even when power supply is interrupted. The output control means writes a signal representative of a state of output processing into the output state storage means. The output state storage means can hold the signal even when power supply is interrupted.

The magnetic disk controller in Japanese patent application 6-19767 records data on the magnetic disk as follows. The output control means accesses a region of the magnetic disk which agrees with the designated output position. The output control means transfers the data from the output data storage means to the magnetic disk, and records the data into a file on the accessed region of the magnetic disk. The amount of the data recorded into the file corresponds to the output-data length. When the data is recorded into the file, the output control means writes a signal, which represents a state where the data is being outputted, into the output state storage means. After the recording of the data into the file has been completed, the output control means writes a signal, which represents a state where the data has been outputted, into the output state storage means. In the output state storage means, the signal representing the state where the data has been outputted replaces the signal representing the state where the data is being outputted. If power supply is interrupted before the recording of the data into the file is completed, the signal representing the state where the data is being outputted remains in the output state storage means.

In Japanese patent application 6-19767, when the magnetic disk controller is restarted, the file restoration means inspects the state represented by the signal stored in the output state storage means. If the state means that the data is being outputted, the file restoration means provides the output control means with a data re-recording request. The output control means implements a data re-recording process in response to the data re-recording request as follows. The output control means reads out the information of the designated output position and the output-data length from the output control information storage means. The output control means accesses the region of the magnetic disk which agrees with the designated output position. The output control means transfers the data from the output data storage means to the magnetic disk again, and re-records the data into the file on the accessed region of the magnetic disk. After the re-recording of the data into the file has been completed, the output control means writes a signal, which represents a state where the data has been outputted, into the output state storage means. Accordingly, in the case where power supply is interrupted during the recording of data into a file on the magnetic disk, data in the file on the magnetic disk can be restored after the interruption of power supply terminates.

A typical recording disk has a recording track divided into sectors to which different addresses are assigned respectively. Every sector corresponds to a minimum unit of data in recording and reproducing information on and from the recording disk. In general, data on a recording disk includes user data and correction-code (ECC) information. The data on the recording disk is divided into blocks (ECC blocks) each having a set of a user data piece and an ECC information piece. During playback, error correction of the user data is implemented block by block. An ECC information piece in every block is predetermined depending on a user data piece in the same block to permit error correction thereof.

In some recording disks, every ECC block of recorded data extends over a plurality of sectors. During the updating of data on such a recording disk, old data is replaced by new data in every ECC block. It is assumed that power supply is interrupted during the replacement of old data by new data in an ECC block. In this case, portions of the new data are recorded on former sectors in the ECC block while portions of the old data remain on latter sectors therein. As a result, there is a discrepancy between a user data piece and an ECC information piece in that ECC block. It is difficult to correctly reproduce a user data piece from such a wrong ECC block since an ECC information piece therein is inconsistent with the user data piece. Thus, it is also difficult to update a portion of the user data piece in a specified sector among sectors of the wrong ECC block.

SUMMARY OF THE INVENTION

It is a first object of this invention to provide a method of recording and reproducing information on and from a disk-shaped recording medium which is less adversely affected by interruption of power supply.

It is a second object of this invention to provide an apparatus for recording and reproducing information on and from a disk-shaped recording medium which is less adversely affected by interruption of power supply.

A first aspect of this invention provides a method of recording and reproducing information on and from a disk ECC-block by ECC-block. Every ECC block is composed of plural sectors. The method comprises the steps of generating a recording command containing information of a recording position on the disk; storing the information of the recording position into a nonvolatile memory; recording data on the disk in response to the recording command; in cases where power supply is turned on after interruption of power supply terminates, detecting a specified ECC block from the information stored in the nonvolatile memory, the specified ECC block being adversely affected by the interruption of power supply during the recording of data on the disk; generating one of a reproducing command and a verify command for at least one sector of the specified ECC block; reproducing data from the specified ECC block on the disk in response to the one of the reproducing command and the verify command; deciding whether or not the reproduction of data from the specified ECC block succeeds or fails; and in cases where it is decided that the reproduction of data from the specified ECC block fails, recording data on a whole of the specified ECC block to convert the specified ECC block into a normal ECC block.

A second aspect of this invention provides a method of recording and reproducing information on and from a disk ECC-block by ECC-block. Every ECC block is composed of plural sectors. The method comprises the steps of generating a recording command for a specified ECC block on the disk, the recording command containing information of a recording position on the disk and information of a recording size, the specified ECC block having sectors designated by the recording command and sectors undesignated by the recording command; writing the information of the recording position and the information of the recording size into a first nonvolatile memory; calculating the undesignated sectors among sectors in the specified ECC block; reproducing existing data from the calculated undesignated sectors in the specified ECC block on the disk; writing the reproduced existing data into a second nonvolatile memory; recording record data on the designated sectors in the specified ECC block on the disk in response to the recording command; writing the record data into a third nonvolatile memory; and in cases where power supply is turned on after interruption of power supply terminates, combining the existing data in the second nonvolatile memory and the record data in the third nonvolatile memory into restored data and recording the restored data on a whole of the specified ECC block on the disk in response to the information of the recording position and the information of the recording size in the first nonvolatile memory.

A third aspect of this invention provides a method of recording and reproducing information on and from a disk ECC-block by ECC-block. The method comprises the steps of recording disk identification information on a specified position on a disk; writing the disk identification information and information of the specified position into a nonvolatile memory; in cases where power supply is turned on after interruption of power supply terminates, reproducing information from a position on a disk which corresponds to the specified position represented by the information in the nonvolatile memory; deciding whether or not the reproduced information and the disk identification information in the nonvolatile memory are equal to each other; and when it is decided that the reproduced information and the disk identification information in the nonvolatile memory are equal to each other, updating a wrong ECC block on the disk into a normal ECC-block, the wrong ECC block being caused by the interruption of power supply during data recording on the disk.

A fourth aspect of this invention provides a method of recording and reproducing information on and from a disk ECC-block by ECC-block. The method comprises the steps of detecting whether or not power supply from a main power source to a disk drive is interrupted; and when it is detected that the power supply from the main power source to the disk drive is interrupted, using an auxiliary power source instead of the main power source and maintaining operation of the disk drive until the disk drive completes recording of data on a whole of a present ECC block on the disk.

A fifth aspect of this invention provides an apparatus for recording and reproducing information on and from a disk ECC-block by ECC-block. Every ECC block is composed of plural sectors. The apparatus comprises means for generating a recording command containing information of a recording position on the disk; a nonvolatile memory; means for storing the information of the recording position into the nonvolatile memory; means for recording data on the disk in response to the recording command; means for, in cases where power supply is turned on after interruption of power supply terminates, detecting a specified ECC block from the information stored in the nonvolatile memory, the specified ECC block being adversely affected by the interruption of power supply during the recording of data on the disk; means for generating one of a reproducing command and a verify command for at least one sector of the specified ECC block; means for reproducing data from the specified ECC block on the disk in response to the one of the reproducing command and the verify command; means for deciding whether or not the reproduction of data from the specified ECC block succeeds or fails; and means for, in cases where it is decided that the reproduction of data from the specified ECC block fails, recording data on a whole of the specified ECC block to convert the specified ECC block into a normal ECC block.

A sixth aspect of this invention provides an apparatus for recording and reproducing information on and from a disk ECC-block by ECC-block. Every ECC block is composed of plural sectors. The apparatus comprises means for generating a recording command for a specified ECC block on the disk, the recording command containing information of a recording position on the disk and information of a recording size, the specified ECC block having sectors designated by the recording command and sectors undesignated by the recording command; a first nonvolatile memory; means for writing the information of the recording position and the information of the recording size into the first nonvolatile memory; means for calculating the undesignated sectors among sectors in the specified ECC block; means for reproducing existing data from the calculated undesignated sectors in the specified ECC block on the disk; a second nonvolatile memory; means for writing the reproduced existing data into the second nonvolatile memory; means for recording record data on the designated sectors in the specified ECC block on the disk in response to the recording command; a third nonvolatile memory; means for writing the record data into the third nonvolatile memory; and means for, in cases where power supply is turned on after interruption of power supply terminates, combining the existing data in the second nonvolatile memory and the record data in the third nonvolatile memory into restored data and recording the restored data on a whole of the specified ECC block on the disk in response to the information of the recording position and the information of the recording size in the first nonvolatile memory.

A seventh aspect of this invention provides an apparatus for recording and reproducing information on and from a disk ECC-block by ECC-block. The apparatus comprises means for recording disk identification information on a specified position on a disk; a nonvolatile memory; means for writing the disk identification information and information of the specified position into the nonvolatile memory; means for, in cases where power supply is turned on after interruption of power supply terminates, reproducing information from a position on a disk which corresponds to the specified position represented by the information in the nonvolatile memory; means for deciding whether or not the reproduced information and the disk identification information in the nonvolatile memory are equal to each other; and means for, when it is decided that the reproduced information and the disk identification information in the nonvolatile memory are equal to each other, updating a wrong ECC block on the disk into a normal ECC block, the wrong ECC block being caused by the interruption of power supply during data recording on the disk.

An eighth aspect of this invention provides an apparatus for recording and reproducing information on and from a disk ECC-block by ECC-block. The apparatus comprises a disk drive; a main power source connected to the disk drive; an auxiliary power source connected to the disk drive; means for detecting whether or not power supply from the main power source to the disk drive is interrupted; and means for, when it is detected that the power supply from the main power source to the disk drive is interrupted, using the auxiliary power source instead of the main power source and maintaining operation of the disk drive until the disk drive completes recording of data on a whole of a present ECC block on the disk.

BRIEF DESCRIPTION OF THE DRAWINGS

FIG. 4 is a diagram of the contents of information stored in a nonvolatile memory in FIG. 1.

FIG. 5 is a diagram of start addresses of first inspected ECC blocks and last inspected ECC blocks.

FIG. 6 is a diagram of accumulated recording sizes.

FIG. 7 is a diagram of start addresses of first inspected ECC blocks and last inspected ECC blocks.

FIG. 13 is a diagram of the contents of information stored in a nonvolatile memory in FIG. 11.

FIG. 14 is a diagram of recording start positions and recording end positions.

FIG. 15 is a diagram of start positions and end positions of existing data ranges.

FIG. 16 is a block diagram of an information recording and reproducing apparatus according to a sixth embodiment of this invention.

DESCRIPTION OF THE PREFERRED EMBODIMENTS

First Embodiment

Figure 1:
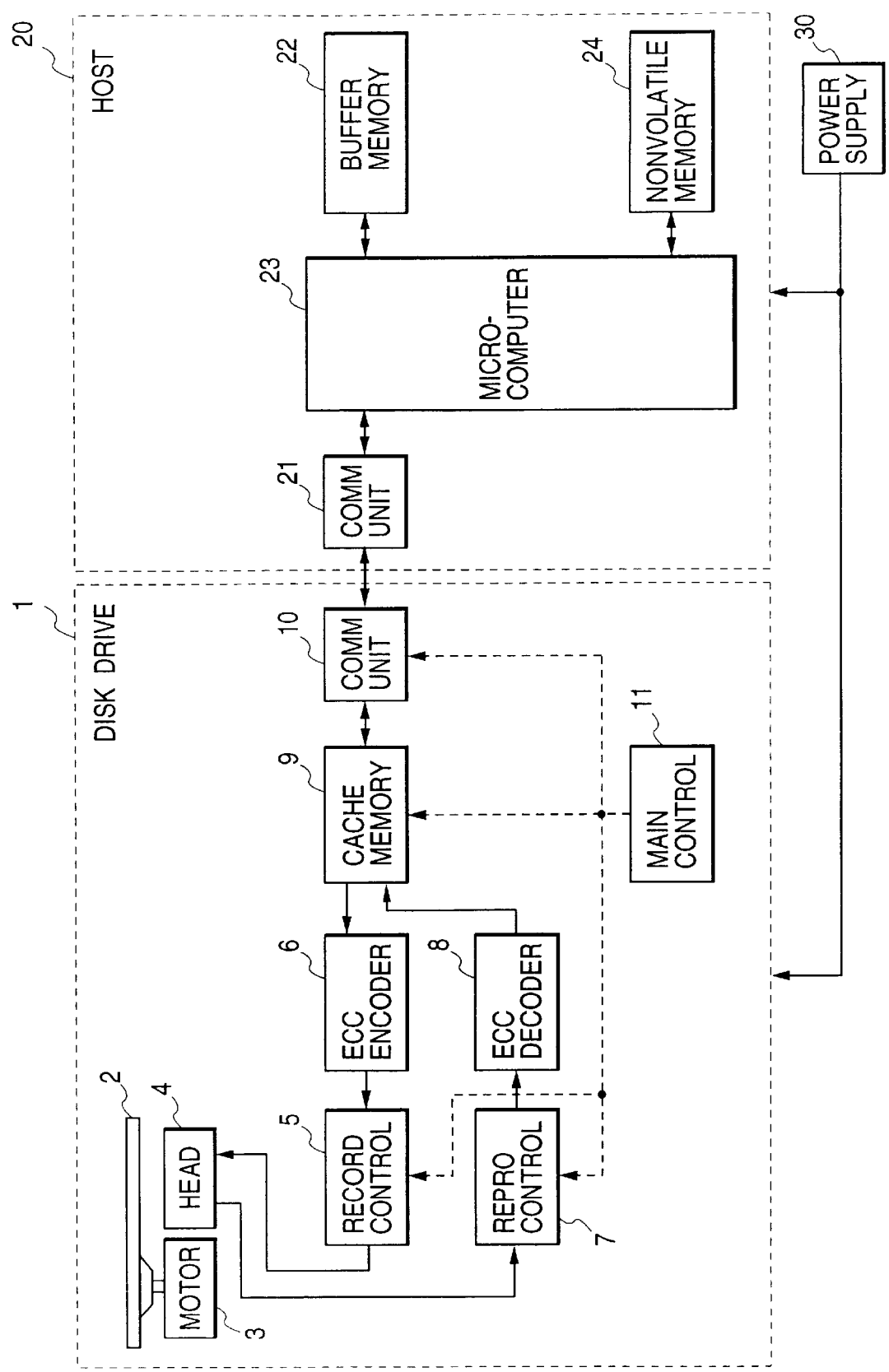
FIG. 1 is a block diagram of an information recording and reproducing apparatus according to a first embodiment of this invention.

FIG. 1 shows an information recording and reproducing apparatus according to a first embodiment of this invention.

The apparatus of FIG. 1 includes a disk drive 1, a host 20, and a power supply 30. The disk drive 1 is connected to the host 20. The disk drive 1 and the host 20 are connected to the power supply 30. The disk drive 1 and the host 20 can be activated by electric power fed from the power supply 30.

The disk drive 1 is designed for a disk 2 which is a recording medium such as an optical disk, a magnetic disk, or a magneto-optical disk. The disk drive 1 includes a motor 3, a head 4, a recording controller 5, an ECC (error correction code) encoder 6, a reproducing controller 7, an ECC decoder 8, a cache memory 9, a communication unit 10, and a main controller 11.

The motor 3 acts to rotate the disk 2. The head 4 accesses the disk 2 which is rotated by the motor 3. The head 4 is connected to the recording controller 5 and the reproducing controller 7. The recording controller 5 is connected to the ECC encoder 6. The ECC encoder 6 is connected to the cache memory 9. The cache memory 9 is connected to the communication unit 10. The communication unit 10 is connected to the host 20. The reproducing controller 7 is connected to the ECC decoder 8. The ECC decoder 8 is connected to the cache memory 9. The main controller 11 is connected to the recording controller 5, the reproducing controller 7, the cache memory 9, and the communication unit 10. The main controller 11 includes a microcomputer programmed to implement desired processes which will be indicated later.

During a recording mode of operation of the disk drive 1, the communication unit 10 receives data to be recorded and commands from the host 20. The communication unit 10 writes the data into the cache memory 9. The data is transferred from the cache memory 9 to the ECC encoder 6. The ECC encoder 6 handles the data as user data. The ECC encoder 6 generates ECC (error correction code) information in response to the user data. The ECC encoder 6 combines the user data and the ECC information into ECC-added data. The ECC encoder 6 outputs the ECC-added data to the recording controller 5. Specifically, the ECC encoder 6 divides the user data into pieces which correspond to ECC blocks respectively. For every ECC block, the ECC encoder 6 generates an ECC information piece in response to a user data piece, and combines the user data piece and the ECC information piece into a 1-block-corresponding segment of ECC-added data. The recording controller 5 informs the head 4 of the ECC-added data. The head 4 records the ECC-added data on the disk 2 block by block. The ECC-added data on the disk 2 is divided into ECC blocks each having a set of a user data piece and an ECC information piece. Every ECC block of the recorded ECC-added data extends over a plurality of sectors in the disk 2. The recording controller 5, the cache memory 9, and the communication unit 10 are controlled by the main controller 11.

During a reproducing mode of operation of the disk drive 1, the head 4 reproduces ECC-added data from the disk 2. The head 4 outputs the reproduced data to the reproducing controller 7. The reproducing controller 7 transmits the reproduced data to the ECC decoder 8. The ECC decoder 8 separates the reproduced data into user data and ECC information. The ECC decoder 8 corrects the user data in response to the ECC information, and thereby generates correction-resultant user data or recovers original user data. Specifically, the ECC decoder 8 implements the data correction block by block. The ECC decoder 8 writes the correction-resultant user data into the cache memory 9. The correction-resultant user data is transferred from the cache memory 9 to the communication unit 10. The communication unit 10 transmits the correction resultant user data to the host 20. The reproducing controller 7, the cache memory 9, and the communication unit 10 are controlled by the main controller 11.

The host 20 includes a communication unit 21, a buffer memory 22, a microcomputer 23, and a non-volatile memory 24. The microcomputer 23 is connected to the communication unit 21, the buffer memory 22, and the nonvolatile memory 24. The communication unit 21 is connected to the communication unit 10 within the disk drive 1.

Data to be recorded can be transferred to the buffer memory 22 from an external device (not shown). The data to be recorded is also referred to as the record data. The microcomputer 23 reads the record data from the buffer memory 22. The microcomputer 23 outputs the record data to the communication unit 21. The communication unit 21 transmits the record data to the communication unit 10 within the disk drive 1. The microcomputer 23 generates a recording command in response to, for example, user's request fed via an operation unit (not shown). The recording command contains information of a designated recording start position and information of a designated recording size. The microcomputer 23 outputs the recording command to the communication unit 21. The communication unit 21 transmits the recording command to the communication unit 10 within the disk drive 1. The microcomputer 23 stores the information of the designated recording start position and the information of the designated recording size into the nonvolatile memory 24 in connection with the recording command.

The microcomputer 23 can generate a reproducing command or a playback command in response to, for example, user's request fed via the operation unit (not shown). In addition, the microcomputer 23 can generate a reproducing command or a playback command when an inspection of data on the disk 2 is required. The microcomputer 23 outputs the reproducing command (the playback command) to the communication unit 21. The communication unit 21 transmits the reproducing command to the communication unit 10 within the disk drive 1. The communication unit 21 can receive reproduced data from the communication unit 10 within the disk drive 1. The communication unit 21 feeds the reproduced data to the microcomputer 23. The microcomputer 23 stores the reproduced data into the buffer memory 22. The reproduced data can be transferred from the buffer memory 22 to an external device (not shown).

The microcomputer 23 can generate information of the position of an ECC block being an inspected object. The microcomputer 23 manages the information of the position of the inspected-object ECC block. The microcomputer 23 can generate a cache flash command or another command different from the recording command and the reproducing command.

The microcomputer 23 includes a combination of an input/output port, a CPU, a ROM, and a RAM. The microcomputer 23 operates in accordance with a program stored in the ROM.

Figure 2:
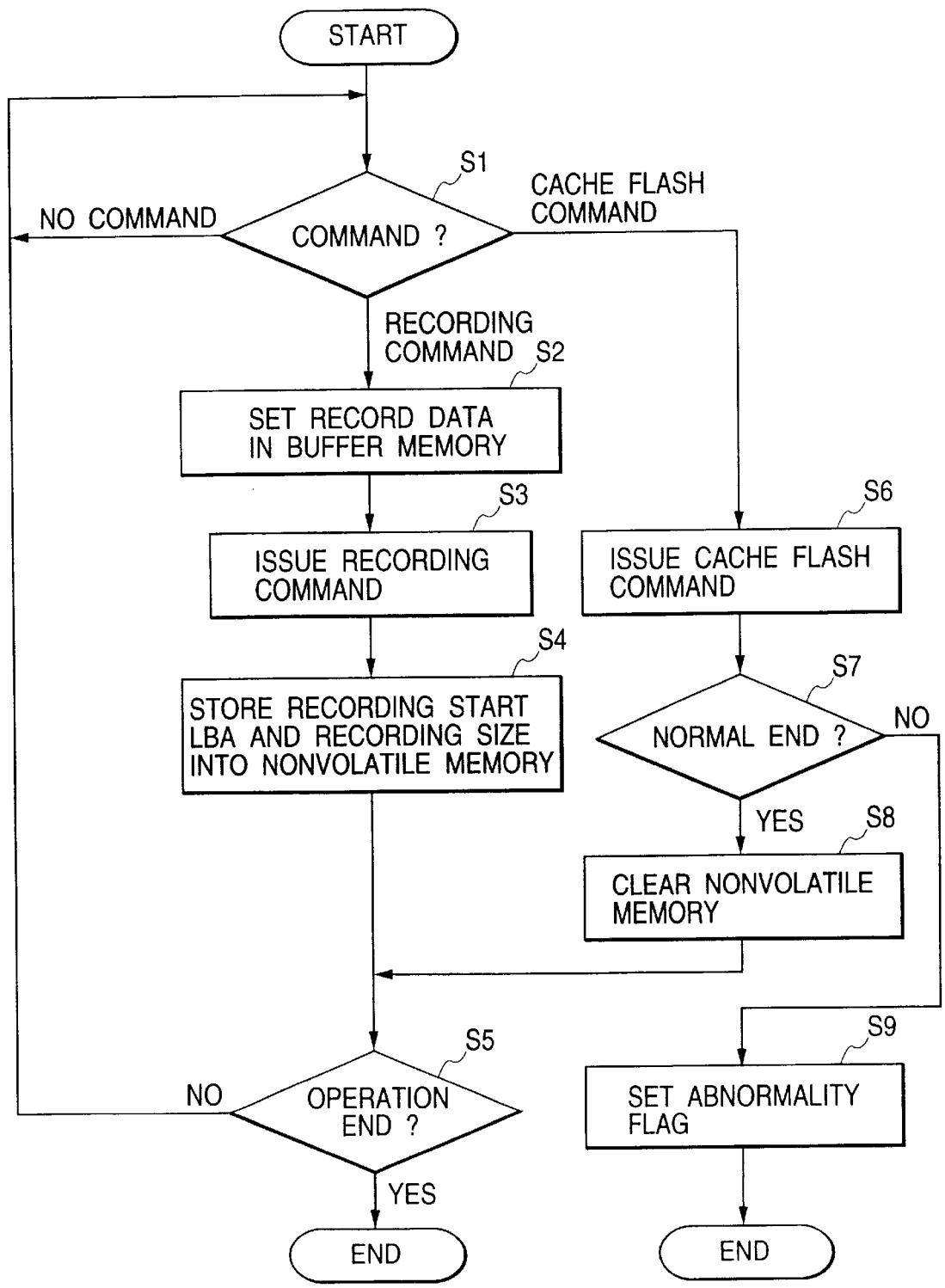
FIG. 2 is a flowchart of a first segment of a program for a microcomputer in FIG. 1.

FIG. 2 is a flowchart of a segment of the program which relates to data recording. As shown in FIG. 2, a first step S1 of the program segment decides whether or not one of a recording command and a cache flash command is requested. In the case where neither a recording command nor a cache flash command is requested, the step S1 is executed again. In the case where one of a recording command and a cache flash command is requested, the step S1 decides whether the requested command is a recording command or a cache flash command. When the requested command is a recording command, the program advances from the step S1 to a step S2. When the requested command is a cache flash command, the program advances from the step S1 to a step S6.

The step S2 loads the buffer memory 22 with data to be recorded (record data). A step S3 following the step S2 designates a recording start position LBA on the disk 2 and a recording size in accordance with the record data and the requested command. Here, LBA is short for a logical block address. The step S3 generates and issues a recording command which relates to the record data, and which includes information of the designated recording start position LBA and the designated recording size. The step S3 outputs the recording command to the communication unit 21. The communication unit 21 transmits the recording command to the communication unit 10 within the disk drive 1. Then, the step S3 transfers the record data from the buffer memory 22 to the communication unit 21. The communication unit 21 transmits the record data to the communication unit 10 within the disk drive 1.

A step S4 subsequent to the step S3 writes the information of the designated recording start position LBA and the designated recording size into the nonvolatile memory 24. A set of information of a designated recording start position LBA and information of a designated recording size can be stored in the nonvolatile memory 24 for each of recording commands. After the step S4, the program advances to a step S5.

The step S6 generates and issues a cache flash command. The step S6 outputs the cache flash command to the communication unit 21. The communication unit 21 transmits the cache flash command to the communication unit 10 within the disk drive 1. The cache flash command requires the disk drive 1 to read data from the cache memory 9 and to record the data on the disk 2.

A step S7 following the step S6 decides whether or not the process (the data transfer from the cache memory 9 onto the disk 2) required by the cache flash command has been normally completed. The step S7 implements this decision by referring to a reply signal transmitted from the disk drive 1. When the process has been normally completed, the program advances from the step S7 to a step S8. Otherwise, the program advances from the step S7 to a step S9.

The step S8 erases the position and size information from the nonvolatile memory 24 which relates to the data transferred onto the disk 2 from the cache memory 9 in response to the cache flash command issued by the previous step S6. After the step S8, the program advances to the step S5.

The step S5 decides whether or not the data recording which relates to the program segment has been completed. When the data recording has been completed, the program exits from the step S5 and then the execution of the program segment ends. When the data recording has not yet been completed, the program returns from the step S5 to the step S1.

The step S9 sets an error flag (an abnormality flag) representing the failure of the data transfer from the cache memory 9 onto the disk 2. Another segment of the program, for example, a main routine of the program, may control a display (not shown) in response to the error flag to indicate a related error message. After the step S9, the execution of the program segment ends.

Regarding the data recording, the disk drive 1 operates as follows. The communication unit 10 within the disk drive 1 receives the recording command and the record data from the communication unit 21 of the host 20. The communication unit 10 informs the main controller 11 of the recording command. The communication unit 10 and the cache memory 9 are controlled by the main controller 11 so that the record data is transferred from the communication unit 10 to the cache memory 9, and is stored thereinto. When storing the record data into the cache memory 9 has been completed, the main controller 11 outputs a signal to the communication unit 10 which represents an end of the execution of the recording command. The communication unit 10 transmits the command-execution-end signal to the communication unit 21 within the host 20 as a reply signal. In the host 20, the reply signal is fed to the microcomputer 23, and is used as a signal for requesting a next recording command or a cache flash command.

The communication unit 10 within the disk drive 1 receives the cache flash command from the communication unit 21 of the host 20. The communication unit 10 informs the main controller 11 of the cache flash command. The cache memory 9 is controlled by the main controller 11 in response to the cache flash command so that the record data is transferred from the cache memory 9 to the ECC encoder 6. The ECC encoder 6 generates ECC information in response to the record data. The ECC encoder 6 combines the record data and the ECC information into ECC-added data. The ECC encoder 6 outputs the ECC-added data to the recording controller 5. The recording controller 5 subjects the ECC-added data to modulation for record. The recording controller 5 informs the head 4 of the modulation-resultant ECC-added data. The head 4 records the modulation-resultant ECC-added data on the disk 2 block by block (ECC-block by ECC-block). The main controller 11 derives the information of the designated recording start position LBA and the information of the designated recording size from the recording command. The main controller 11 feeds the information of the designated recording start position LBA and the information of the designated recording size to the recording controller 5. The recording controller 5 controls the data recording on the disk 2 in response to the information of the designated recording start position LBA and the information of the designated recording size so that the modulation-resultant ECC-added data will be recorded on a region of the disk 2 which is determined by the designated recording start position LBA and the designated recording size. When the data transfer from the cache memory 9 onto the disk 2 has been completed, the main controller 11 outputs a signal to the communication unit 10 which represents an end of the execution of the cache flash command. The communication unit 10 transmits the command-execution-end signal to the communication unit 21 within the host 20 as a reply signal. In the host 20, the reply signal is fed to the microcomputer 23, and is used, for example, at the step S7 in FIG. 2.

An explanation will be given of the case where the feed of electric power from the power supply 30 to the disk drive 1 and the host 20 is interrupted during the recording of data on the disk 2. In this case, record data in the cache memory 9 disappears. Regarding an ECC block which is being recorded at the moment of the occurrence of the interruption of power supply, portions of data assigned to the ECC block have been recorded on former sectors in the ECC block while other portions of the data fail to be recorded on latter sectors therein. As a result, the ECC block becomes a wrong ECC block in which a user data piece and an ECC information piece are inconsistent with each other.

Figure 3:
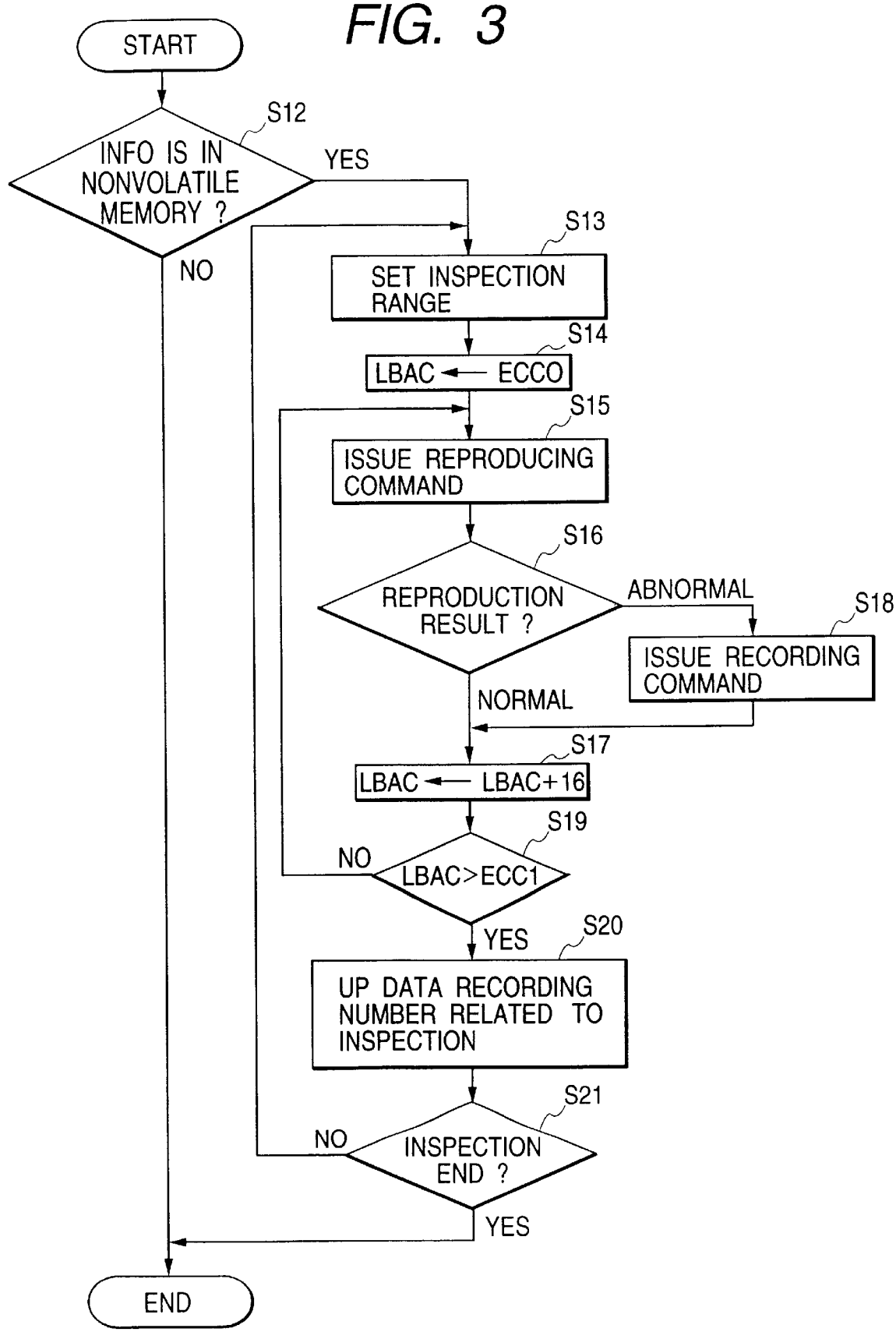
FIG. 3 is a flowchart of a second segment of the program for the microcomputer in FIG. 1.

FIG. 3 is a flowchart of a segment of the program for the microcomputer 23 which relates to the removal of a wrong ECC block from the disk 2. The program segment in FIG. 3 is executed when the apparatus of FIG. 1 is restarted.

With reference to FIG. 3, a first step S12 of the program segment accesses the nonvolatile memory 24. The step S12 decides whether or not information (information of a designated recording start position and information of a designated recording size) remains in the nonvolatile memory 24. When information remains in the nonvolatile memory 24, the program advances from the step S12 to a step S13. Otherwise, the program exits from the step S12, and then the execution of the program segment ends.

The step S13 sets an inspection range or inspection ranges in response to the information remaining in the nonvolatile memory 24. FIG. 4 shows an example of the contents of the information remaining in the nonvolatile memory 24. Serial recording numbers "1", "2", "3", . . . are assigned to recording commands respectively. A set of information of a designated recording start position LBA and information of a designated recording size in each recording command is stored and managed in connection with information of a recording number assigned to the recording command. In FIG. 4, regarding the recording command having the recording number "1", the designated recording start position LBA corresponds to "500" (=TOPLBA), and the designated recording size corresponds to "20" in LBA (=WRSIZE). In the case where one ECC block is composed of "16" in LBA (16 sectors), 2 ECC blocks correspond to the recording command having the recording number "1". The start LBA of the first ECC block is "496" while the start LBA of the second ECC block (the last ECC block) is "512". The start LBA of the first ECC block is indicated by ECC0, and the start LBA of the second ECC block (the last ECC block) is indicated by ECC1. The start addresses ECC0 and ECC1 are given as follows.

$$ECC0 = 16 \times \text{int}\{TOPLBA/16\}$$

$$ECC1 = 16 \times \text{int}\{(TOPLBA+WRSIZE-1)/16\}$$

where "x" denotes product, and "int { . . . }" denotes integer part of a value in braces. The step S13 defines ECC blocks denoted by the start addresses ECC0 and ECC1 as an inspection range corresponding to the recording command having the recording number "1". As shown in FIG. 5, the start addresses ECC0 and ECC1 are "496" and "512" respectively. It should be noted that the start address of a first ECC block on the disk 2 is "0" in LBA, and the start addresses of second and later ECC blocks on the disk 2 are equal to multiples of "16" in LBA respectively.

With reference back to FIG. 3, a step S14 following the step S13 sets a designated reproducing start position (a designated inspection start position) LBAC equal to the start address ECC0 of the first ECC block. After the step S14, the program advances to a step S15. The step S15 generates and issues a reproducing command (a playback command) which contains information of the designated reproducing start position LBAC and also information of a designated reproducing size corresponding to 16 sectors (a 1-block size). The step S15 outputs the reproducing command to the communication unit 21. The communication unit 21 transmits the reproducing command to the communication unit 10 within the disk drive 1. It should be noted that the reproducing command may be replaced by a reproducing command for one LBA in the ECC block denoted by the start address ECC0.

In the disk drive 1, the communication unit 10 informs the main controller 11 of the reproducing command. The main controller 11 derives the information of the designated reproducing start position (the designated inspection start position) LBAC and the information of the designated reproducing size from the reproducing command. The main controller 11 feeds the information of the designated reproducing start position LBAC and the information of the designated reproducing size to the reproducing controller 7. The head 4 reproduces data from the disk 2. The reproducing controller 7 controls the data reproduction from the disk 2 in response to the information of the designated reproducing start position LBAC and the information of the designated reproducing size so that data of an ECC block will be reproduced from a region of the disk 2 which is determined by the designated reproducing start position LBAC and the designated reproducing size. The head 4 outputs the reproduced data to the reproducing controller 7. The reproducing controller 7 subjects the reproduced data to demodulation. The reproducing controller 7 feeds the demodulation-resultant reproduced data to the ECC decoder 8. The ECC decoder 8 subjects the demodulation-resultant reproduced data to error correction. When the error correction is successfully implemented, the ECC decoder 8 generates correction-resultant user data from the demodulation-resultant reproduced data. The ECC decoder 8 stores the correction-resultant user data into the cache memory 9. In addition, the ECC decoder 8 informs the main controller 11 of a normal end status which represents that the present ECC block is normal. On the other hand, when the error correction fails to be implemented, the ECC decoder 8 informs the main controller 11 of an abnormal end status which represents that the present ECC block is wrong. The main controller 11 feeds the normal end status or the abnormal end status to the communication unit 10. The communication unit 10 is controlled by the main controller 11 so that the normal end status or the abnormal end status will be transmitted to the communication unit 21 within the host 20 as a reply signal. In the host 23, the reply signal is fed to the microcomputer 23 from the communication unit 21. The cache memory 9 and the communication unit 10 are controlled by the main controller 11 in response to the normal end status so that the communication unit 10 reads the correction-resultant user data from the cache memory 9, and transmits the correction-resultant user data to the communication unit 21 within the host 20.

In FIG. 3, a step S16 subsequent to the step S15 decides whether the reply signal agrees with a normal end status or an abnormal end status. When the reply signal agrees with a normal end status, the program advances from the step S16 to a step S17. When the reply signal agrees with an abnormal end status, the program advances from the step S16 to a step S18.

The step S18 generates and issues a recording command for the wrong ECC block. Specifically, the step S18 designates a recording start position LBA on the disk 2 and a recording size. The designated recording start position LBA is equal to the start position LBAC. The designed recording size corresponding to 16 sectors (a 1-block size). The step S18 outputs the recording command to the communication unit 21. The communication unit 21 transmits the recording command to the communication unit 10 within the disk drive 1. Then, the step S18 generates predetermined record data (fixed record data). For example, all the bits of the predetermined record data are "0" in logic state. The step S18 outputs the predetermined record data to the communication unit 21. The communication unit 21 transmits the predetermined record data to the communication unit 10 within the disk drive 1.

In the disk drive 1, the communication unit 10 informs the main controller 11 of the recording command. The communication unit 10 and the cache memory 9 are controlled by the main controller 11 so that the predetermined record data is transferred from the communication unit 10 to the cache memory 9, and is stored thereinto. The cache memory 9 is controlled by the main controller 11 in response to the recording command so that the predetermined record data is transferred from the cache memory 9 to the ECC encoder 6. The ECC encoder 6 generates ECC information in response to the predetermined record data. The ECC encoder 6 combines the predetermined record data and the ECC information into predetermined ECC-added data. The ECC encoder 6 outputs the predetermined ECC-added data to the recording controller 5. The recording controller 5 subjects the predetermined ECC-added data to modulation for record. The recording controller 5 informs the head 4 of the predetermined modulation-resultant ECC-added data. The head 4 records the predetermined modulation-resultant ECC-added data on the disk 2. The main controller 11 derives the information of the designated recording start position LBAC and the information of the designated recording size from the recording command. The main controller 11 feeds the information of the designated recording start position LBAC and the information of the designated recording size to the recording controller 5. The recording controller 5 controls the data recording on the disk 2 in response to the information of the designated recording start position LBAC and the information of the designated recording size so that the predetermined modulation-resultant ECC-added data will be recorded on a region of the disk 2 which is determined by the designated recording start position LBAC and the designated recording size. In this way, the wrong ECC block on the disk 2 is replaced by or updated into a normal ECC block mainly filled with the predetermined record data.

The recording command generated and issued by the step S18 is preferably a "write & verify" command. The recording command generated and issued by the step S18 may be a "write" command. The "write & verify" command is effective to the case where the wrong ECC block is caused by a defective sector. This is because the "write & verify" command enables another sector being a normal one to be substituted for the defective sector.

In FIG. 3, after the step S18, the program advances to the step S17. The step S17 updates the inspection start position LBAC into correspondence with a next ECC block by referring to a program statement as "LBAC ←LBAC+16". A step S19 following the step S17 decides whether or not the inspection start position LBAC exceeds the start address ECC1 of the last ECC block. When the inspection start position LBAC does not exceed the start address ECC1 of the last ECC block, the program returns from the step S19 to the step S15. In this case, the previously-indicated inspection process is implemented on the next ECC block. On the other hand, when the inspection start position LBAC exceeds the start address ECC1 of the last ECC block, the program advances from the step S19 to a step S20.

The step S20 updates or increments the inspection-related recording number by "1". A step S21 following the step S20 decides whether or not the inspection processes related to all the recording numbers represented by the information in the nonvolatile memory 24 have been completed. When the inspection processes related to all the recording numbers have been completed, the program exits from the step S21 and then the execution of the program segment ends. Otherwise, the program returns from the step S21 to the step S13. In this case, the inspection process related to the next recording number is implemented.

As previously mentioned, a wrong ECC block tends to occur on the disk 2 in the case where power supply is interrupted during the recording of data on the disk 2. When the interruption of power supply terminates and then the apparatus of FIG. 1 is restarted, such a wrong ECC block on the disk 2 is replaced by a normal ECC block mainly filled with the predetermined record data. Accordingly, it is possible to prevent unwanted stop of the reproduction of data from the disk 2 which might be caused by a wrong ECC block thereon.

It should be noted that two or more recording commands may be managed in the nonvolatile memory 24 as one recording command. An example thereof is as follows. In FIG. 4, regarding the recording command having the recording number "4", the designated recording start position LBA corresponds to "600", and the designated recording size corresponds to "10" in LBA.

Regarding the recording command having the recording number "5", the designated recording start position LBA corresponds to "610", and the designated recording size corresponds to "20" in LBA. The recording command having the recording number "4" and the recording command having the recording number "5" m ay be managed as one recording command about which the designated recording start position LBA corresponds to "600" and the designated recording size corresponds to "30" in LBA.

Second Embodiment

Figure 8:
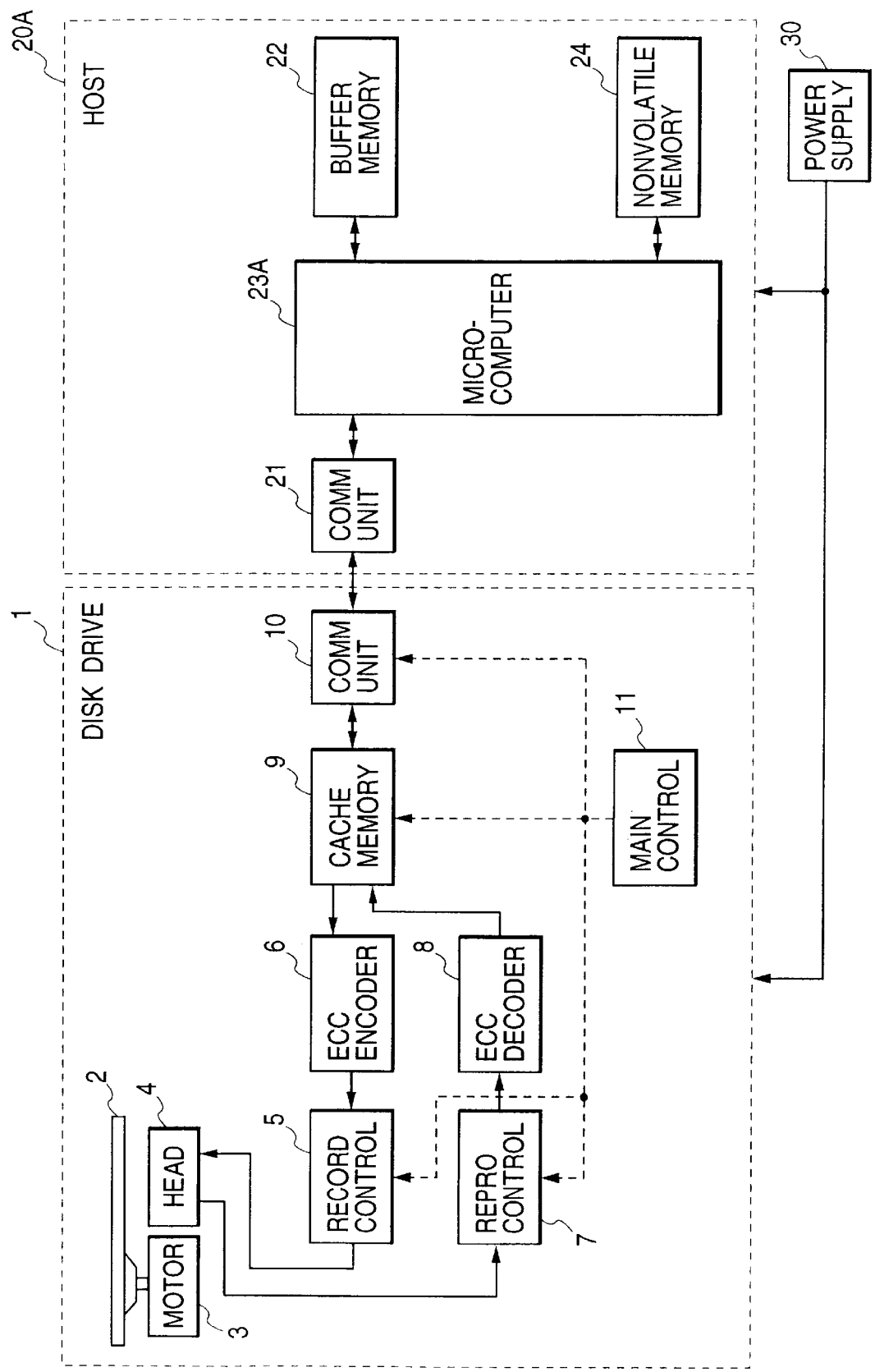
FIG. 8 is a block diagram of an information recording and reproducing apparatus according to a second embodiment of this invention.

FIG. 8 shows an information recording and reproducing apparatus according to a second embodiment of this invention. The apparatus of FIG. 8 is similar to the apparatus of FIG. 1 except that a host 20A and a microcomputer 23A replace the host 20 and the microcomputer 23 respectively.

In a disk drive 1, when a cache memory 9 becomes fully occupied, old data is transferred from the cache memory 9 onto a disk 2 to provide an unoccupied region in the cache memory 9. New data is written into the unoccupied region in the cache memory 9.

The microcomputer 23A in the host 20A is programmed to implement the following processes. The microcomputer 23A calculates the sum of recording sizes represented by information stored in a nonvolatile memory 24. In the case where the calculated sum of the recording sizes exceeds the capacity of the cache memory 9, old data corresponding to an excess over the capacity of the cache memory 9 is deleted from an inspected object.

FIG. 4 shows an example of sets of designated recording start positions LBA and designated recording sizes which correspond to the recording numbers "1", "2", "3", "4", "5", and "6", respectively. FIG. 6 shows accumulated recording sizes as viewed in the direction toward the past from the latest recording command which has the recording number "6". It is assumed that the capacity of the cache memory 9 corresponds to 256 sectors. In this case, as understood from FIG. 6, the amount of record data corresponding to the recording numbers "1" and "2" exceeds the capacity of the cache memory 9. Thus, at the present time related to the latest recording command which has the recording number "6", all the record data corresponding to the recording numbers "1" and "2" has already been recorded on the disk 2. In view of this fact, the microcomputer 23A deletes the record data corresponding to the recording numbers "1" and "2" from an inspected object. On the other hand, only a former portion of record data corresponding to the recording number "3" has already been recorded on the disk 2 while the latter portion thereof remains in the cache memory 9. A start address ECC0 of a first inspected ECC block is moved back by a value corresponding to the capacity of the cache memory 9. As shown in FIG. 7, regarding the recording command having the recording number "3", the start address ECC0 of the first inspected ECC block is set to "160" while the start address ECC1 of the last inspected ECC block remains equal to "192". All record data corresponding to the recording numbers "4", "5", and "6" is an inspected object.

Third Embodiment

Figure 9:
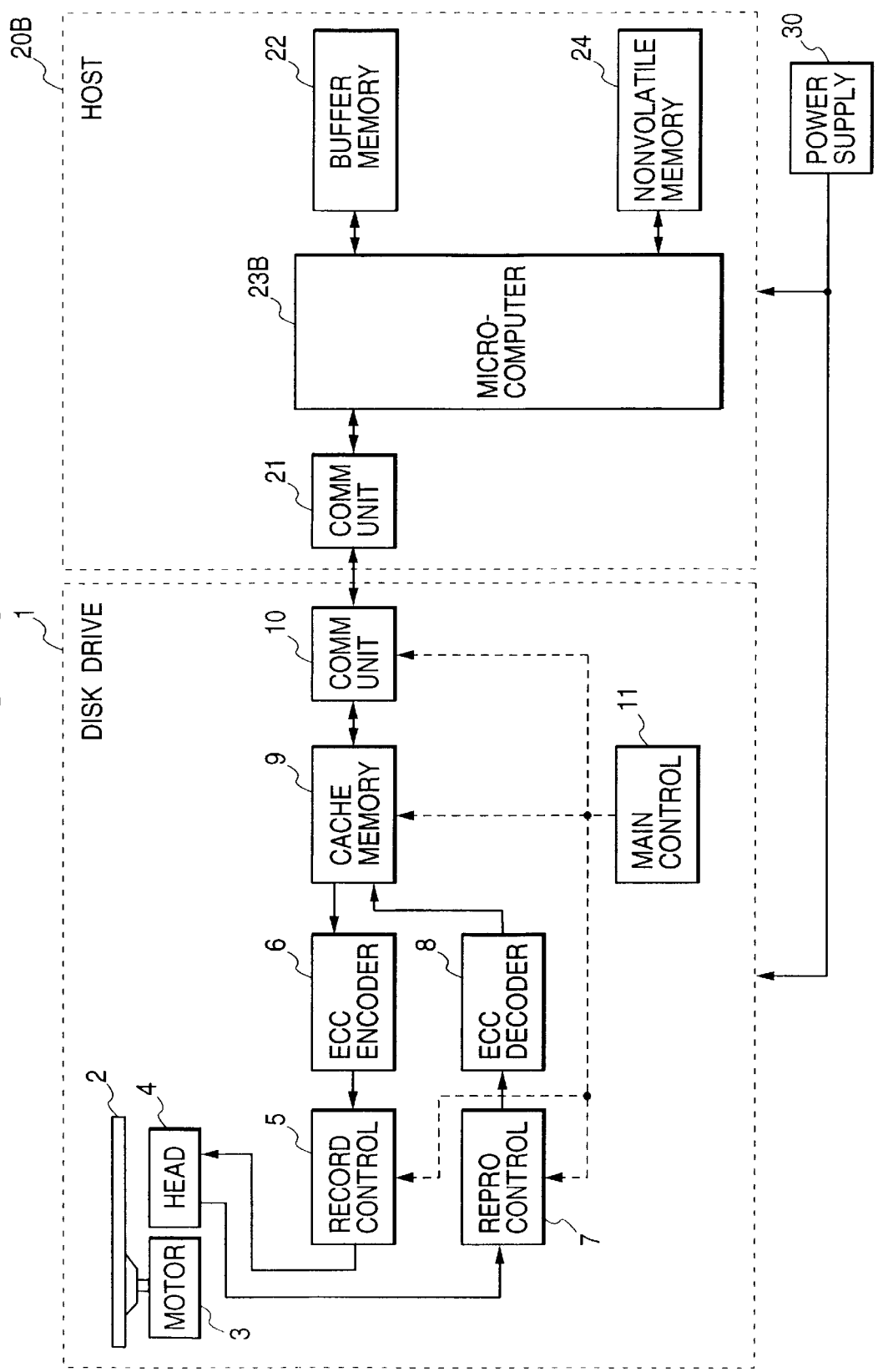
FIG. 9 is a block diagram of an information recording and reproducing apparatus according to a third embodiment of this invention.

FIG. 9 shows an information recording and reproducing apparatus according to a third embodiment of this invention. The apparatus of FIG. 9 is similar to the apparatus of FIG. 1 except that a host 20B and a microcomputer 23B replace the host 20 and the microcomputer 23 respectively. The microcomputer 23B is programmed to issue a "verify" command instead of a reproducing command.

An explanation will be given of operation of the apparatus in FIG. 9 which is restarted after interruption of power supply terminates. The microcomputer 23B decides whether or not information (information of a designated recording start position and information of a designated recording size) remains in a nonvolatile memory 24. When information remains in the nonvolatile memory 24, the microcomputer 23B sets an inspection range or inspection ranges in response to the information remaining in the nonvolatile memory 24. Then, the microcomputer 23B sets a designated reproducing start position (a designated inspection start position) LBAC equal to a start address ECC0 of a first inspected ECC block. Subsequently, the microcomputer 23B generates and issues a "verify" command which contains information of the designated reproducing start position LBAC and also information of a designated reproducing size corresponding to 16 sectors (a 1-block size). The host 20B transmits the "verify" command to a disk drive 1.

In the disk drive 1, a communication unit 10 receives the "verify" command, and informs a main controller 11 of the "verify" command. The main controller 11 derives the information of the designated reproducing start position (the designated inspection start position) LBAC and the information of the designated reproducing size from the "verify" command. The main controller 11 feeds the information of the designated reproducing start position LBAC and the information of the designated reproducing size to a reproducing controller 7. A head 4 reproduces data from a disk 2. The reproducing controller 7 controls the data reproduction from the disk 2 in response to the information of the designated reproducing start position LBAC and the information of the designated reproducing size so that data of an ECC block will be reproduced from a region of the disk 2 which is determined by the designated reproducing start position LBAC and the designated reproducing size. The head 4 outputs the reproduced data to the reproducing controller 7. The reproducing controller 7 subjects the reproduced data to demodulation. The reproducing controller 7 feeds the demodulation-resultant reproduced data to an ECC decoder 8. The ECC decoder 8 subjects the demodulation-resultant reproduced data to error correction. When the error correction is successfully implemented, the ECC decoder 8 informs the main controller 11 of a normal end status which represents that the present ECC block is normal. On the other hand, when the error correction fails to be implemented, the ECC decoder 8 informs the main controller 11 of an abnormal end status which represents that the present ECC block is wrong. The main controller 11 feeds the normal end status or the abnormal end status to the communication unit 10. The communication unit 10 is controlled by the main controller 11 so that the normal end status or the abnormal end status will be transmitted to the host 20B as a reply signal.

When the error correction is successfully implemented, the ECC decoder 8 generates correction-resultant user data from the demodulation-resultant reproduced data. The "verify" command causes the disk drive 1 not to transmit the correction-resultant user data to the host 23B. Accordingly, it is unnecessary to provide the host 23B with a memory area for storing the correction-resultant user data.

Fourth Embodiment

Figure 10:
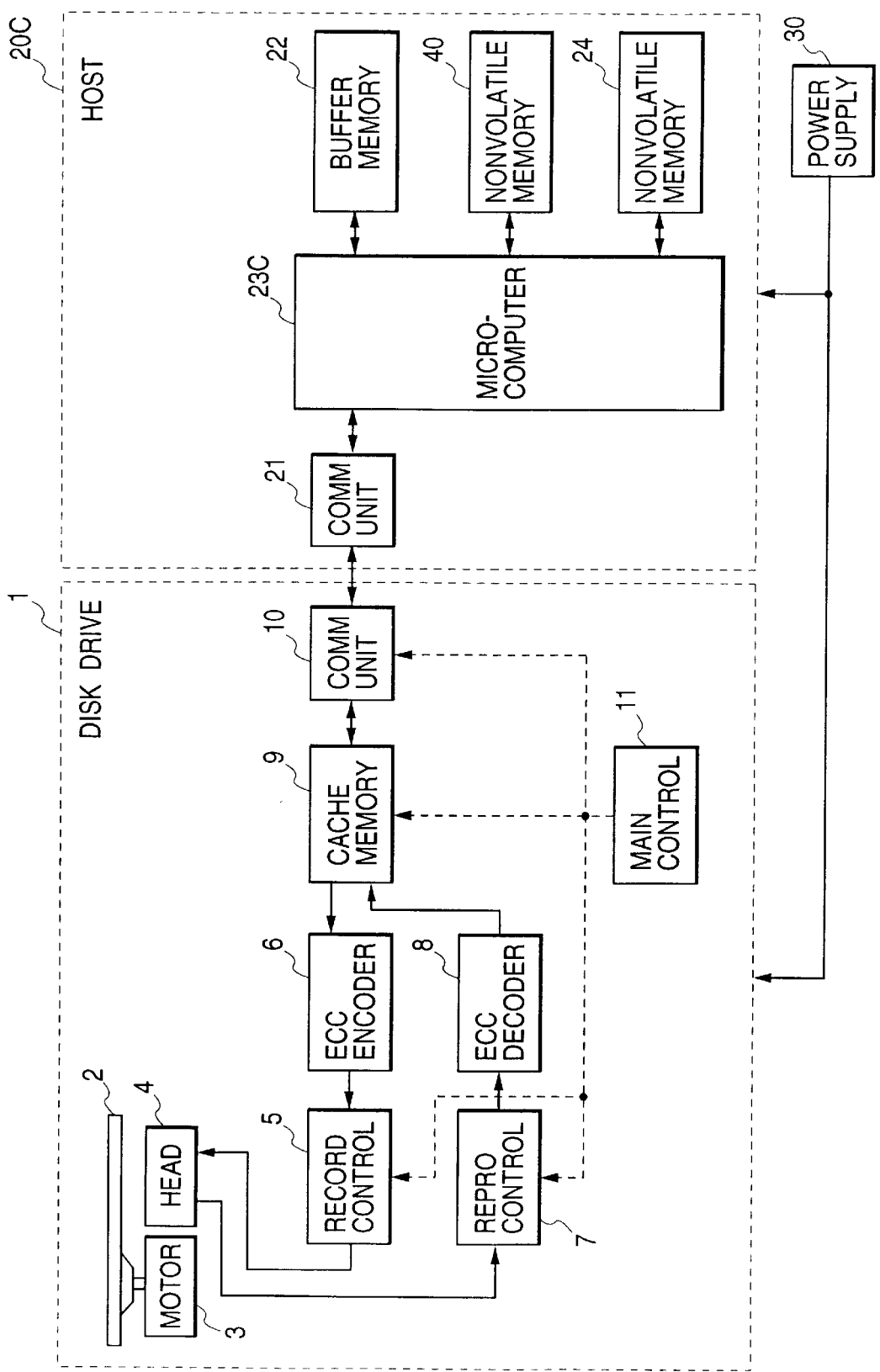
FIG. 10 is a block diagram of an information recording and reproducing apparatus according to a fourth embodiment of this invention.

FIG. 10 shows an information recording and reproducing apparatus according to a fourth embodiment of this invention. The apparatus of FIG. 10 is similar to the apparatus of FIG. 1 except for design changes mentioned later. The apparatus of FIG. 10 includes a host 20C and a microcomputer 23C which replace the host 20 and the microcomputer 23 respectively. The host 20C includes a nonvolatile memory 40 connected to the microcomputer 23C. The nonvolatile memory 40 is used in managing disk ID (identification) information.

When the apparatus of FIG. 10 is turned on and a disk drive 1 is activated, the microcomputer 23C generates disk ID information and a recording command. The disk ID information represents a disk ID number, a disk name, or a time. The recording command requires the disk ID information to be recorded on a specified position of a disk 2. The recording command contains information of a specified LBA (a specified logical block address) on the disk 2 which denotes the specified position of the disk 2, that is, the disk-ID-information record position on the disk 2. The microcomputer 23C issues the disk ID information and the recording command to a communication unit 21. The communication unit 21 transmits the disk ID information and the recording command to the disk drive 1. The disk drive 1 records the disk ID information on the specified position of the disk 2 in response to the recording command. The microcomputer 23C writes the disk ID information and also the information of the specified LBA (the disk-ID-information record position on the disk 2) into the nonvolatile memory 40.

The disk ID information may be recorded in a specified file in the disk 2 and which can be handled by an OS (operating system) such as DOS, Windows, or UNIX. The file to be loaded with the disk ID information is made in the disk 2 while being named, for example, "DISKINFO". The disk ID information is recorded into the "DISKINFO" file. When the "DISKINFO" file is moved by a file copying process or another process, the actual position of the disk 2 at which the disk ID information is recorded changes. In this case, the specified LBA represented by the disk ID information is changed accordingly, and confirmation is made as to whether the "DISKINFO" file is present in the new position, and whether the contents of the "DISKINFO" file agree with the disk ID information.

In the case where the apparatus in FIG. 10 is restarted after interruption of power supply terminates, the microcomputer 23C reads the disk ID information and the information of the specified LBA (the disk-ID-information record position on the disk 2) from the nonvolatile memory 40. Then, the microcomputer 23C generates a reproducing command which contains the information of the specified LBA. The microcomputer 23C issues the reproducing command to a communication unit 21. The communication unit 21 transmits the reproducing command to the disk drive 1. The disk drive 1 reproduces information from a position of a disk 2 which corresponds to the specified LBA represented by the reproducing command. The disk drive 1 returns the reproduced information to the communication unit 21 within the host 20C. The communication unit 21 feeds the reproduced information to the microcomputer 23C. The microcomputer 23C decides whether or not the reproduced information is equal to the disk ID information read from the nonvolatile memory 40. In the case where the reproduced information is equal to the disk ID information, the microcomputer 23C decides that the present disk 2 is the same as the disk 2 which was in the disk drive 1 when the interruption of power supply occurred. In the case where the reproduced information is not equal to the disk ID information, the microcomputer 23C decides that the present disk 2 differs from the disk 2 which was in the disk drive 1 when the interruption of power supply occurred. Provided that the present disk 2 is the same as the disk 2 which was in the disk drive 1 when the interruption of power supply occurred, the microcomputer 23C implements a process of removing a wrong ECC block from the present disk 2. Accordingly, in the case where the present disk 2 differs from the disk 2 which was in the disk drive 1 when the interruption of power supply occurred, it is possible to prevent the present disk 2 from being erroneously subjected to the wrong-ECC-block removing process.

Fifth Embodiment

Figure 11:
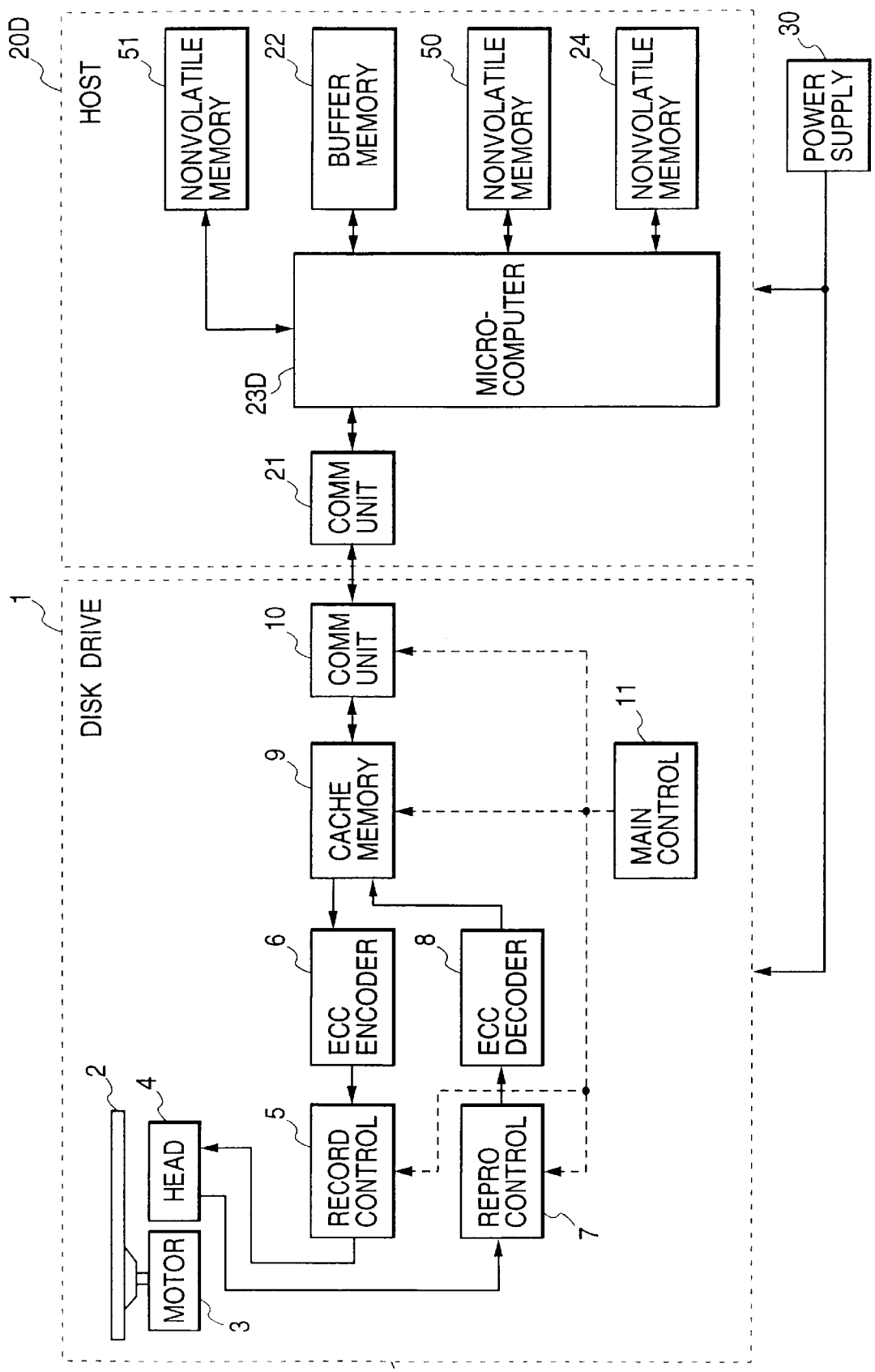
FIG. 11 is a block diagram of an information recording and reproducing apparatus according to a fifth embodiment of this invention.

FIG. 11 shows an information recording and reproducing apparatus according to a fifth embodiment of this invention. The apparatus of FIG. 11 is similar to the apparatus of FIG. 1 except for design changes mentioned later. The apparatus of FIG. 11 includes a host 20D and a microcomputer 23D which replace the host 20 and the microcomputer 23 respectively. The host 20D includes nonvolatile memories 50 and 51 connected to the microcomputer 23D. The nonvolatile memory 50 is used in storing data equal to existing data recorded on undesignated sectors in a first inspected ECC block and a last inspected ECC block. The undesignated sectors are unrelated to recording positions for the present record data. The nonvolatile memory 51 is used in storing data to be recorded in response to a recording command.

Figure 12:
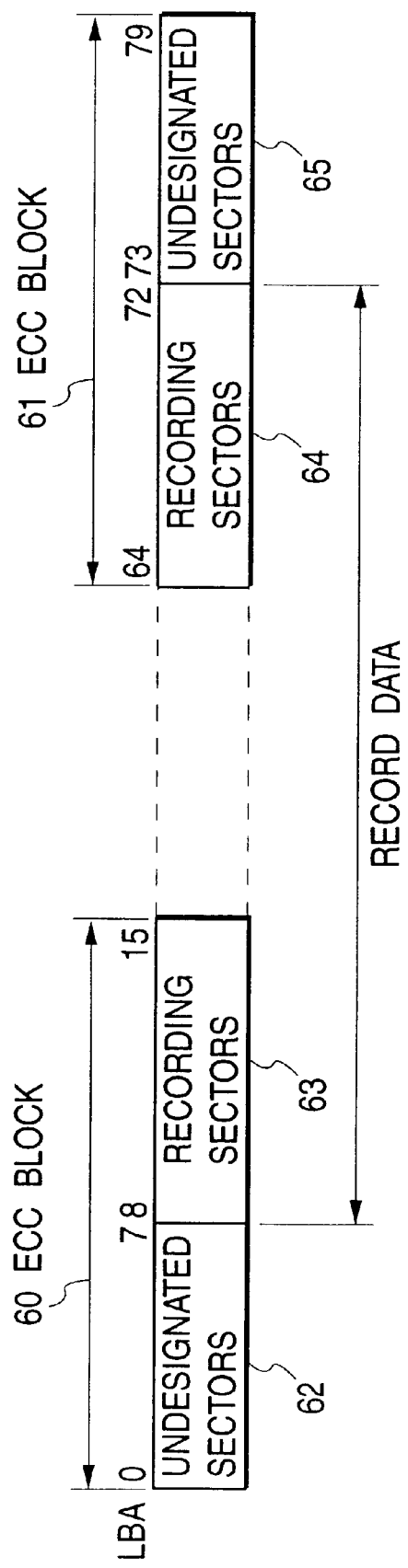
FIG. 12 is a diagram of sectors and ECC blocks on a disk.

FIG. 12 shows an example of conditions of the recording of data on disk sectors. In FIG. 12, there is a sequence of ECC blocks. A first ECC block 60 in the ECC block sequence extends from an LBA of "0" to an LBA of "15", while a last ECC block 61 therein extends from an LBA of "64" to an LBA of "79". The first ECC block 60 is divided into a former half 62 occupied by undesignated sectors and a latter half 63 occupied by sectors designated as recording sectors. The recording sectors in the first ECC block 60 extends from an LBA of "8" to an LBA of "15". The last ECC block 61 is divided into a former half 64 occupied by sectors designated as recording sectors and a latter half 65 occupied by undesignated sectors. The recording sectors in the last ECC block 61 extend from an LBA of "64" to an LBA of "72". Record data is recorded on successive recording sectors which extend from an LBA of "8" to an LBA of "72".

During a recording mode of operation of the apparatus in FIG. 11, the microcomputer 23D calculates a start address ECC0 of the first ECC block 60 from a designated recording start position which is equal to an LBA of "8". The calculated start address ECC0 of the first ECC block 60 is equal to an LBA of "0". The microcomputer 23D generates a reproducing command in response to the calculated start address ECC0 of the first ECC block 60 and the designated recording start position. The reproducing command is designed to require the reproduction of existing data from undesignated sectors of a disk 2 which extend between an LBA of "0" and an LBA of "7" immediately preceding the designated recording start position (an LBA of "8"). The microcomputer 23D issues the reproducing command to a communication unit 21. The communication unit 21 transmits the reproducing command to a disk drive 1. In response to the reproducing command, the disk drive 1 reproduces existing data from the undesignated sectors of the disk 2 which extend between an LBA of "0" and an LBA of "7". The disk drive 1 returns the reproduced existing data to the communication unit 21 within the host 20D. The communication unit 21 feeds the reproduced existing data to the microcomputer 23D. The microcomputer 23D writes the reproduced existing data into the nonvolatile memory 50.

Subsequently, the microcomputer 23D calculates an end address of the last ECC block 61 which contains a recording end position equal to an LBA of "72". The calculated end address of the last ECC block 61 is equal to an LBA of "79". The microcomputer 23D generates a reproducing command in response to the calculated end address of the last ECC block 61 and the recording end position. The reproducing command is designed to require the reproduction of existing data from undesignated sectors of the disk 2 which extend between an LBA of "73" and an LBA of "79". It should be noted that an LBA of "73" immediately follows the recording end position (an LBA of "72"). The microcomputer 23D issues the reproducing command to the communication unit 21. The communication unit 21 transmits the reproducing command to the disk drive 1. In response to the reproducing command, the disk drive 1 reproduces existing data from the undesignated sectors of the disk 2 which extend between an LBA of "73" and an LBA of "79". The disk drive 1 returns the reproduced existing data to the communication unit 21 within the host 20D. The communication unit 21 feeds the reproduced existing data to the microcomputer 23D. The microcomputer 23D writes the reproduced existing data into the nonvolatile memory 50.

Then, the microcomputer 23D issues a recording command to the communication unit 21. The recording command is designed to record data on a region of the disk 2 which extends from an LBA of "8" to an LBA of "72". The recording command contains information of a designated recording start position and information of a designated recording size. The microcomputer 23D transfers record data from a buffer memory 22 to the communication unit 21. The communication unit 21 transmits the recording command and the record data to the disk drive 1. In response to the recording command, the disk drive 1 records the record data on the region of the disk 2 which extends from an LBA of "8" to an LBA of "72". In the host 20D, the microcomputer 23D stores the information of the designated recording start position and the information of the designated recording size into a nonvolatile memory 24. The microcomputer 23D copies the record data from the buffer memory 22, and writes the copied record data into the nonvolatile memory 51. Thus, as denoted by a recording number of "1" in FIG. 13, a set of information of a designated recording start position LBA and information of a designated recording size is stored in the nonvolatile memory 51. A sequence of the above-mentioned steps is implemented for each of recording commands. The host 20D transmits a cache flash command to the disc drive 1. The microcomputer 23D decides whether or not the process (the data transfer from a cache memory 9 onto the disk 2) required by the cache flash command has been normally completed. When the process has been normally completed, the microcomputer 23D erases the position and size information from the nonvolatile memory 24. In addition, the microcomputer 23D erases the reproduced existing data from the nonvolatile memory 50. Furthermore, the microcomputer 23D erases the record data from the nonvolatile memory 51.

When the apparatus in FIG. 11 is turned on, the microcomputer 23D decides whether or not information (information of a designated recording start position and information of a designated recording size) remains in the nonvolatile memory 24. In the case where information remains in the nonvolatile memory 24, the microcomputer 23D implements a process of removing a wrong ECC block from the disk 2 as follows.

During a first stage of the wrong-ECC-block removing process, the microcomputer 23D derives the start address ECC0 of the first ECC block 60 from the information in the nonvolatile memory 24. The first ECC block 60 relates to the recording number "1", and contains the recording start position LBA0. As shown in FIG. 14, the recording start position LBA0 is equal to an LBA of "8". As shown in FIG. 15, the start address ECC0 of the first ECC block 60 is equal to 41 an LBA of "0". The microcomputer 23D decides whether or not the start address ECC0 of the first ECC block 60 and the recording start position LBA0 are different from each other. When the start address ECC0 of the first ECC block 60 and the recording start position LBA0 are different from each other, it is decided that first undesignated data equal to existing data on disk sectors extending from the position ECC0 to the position LBA0 is stored in the nonvolatile memory 50. In this case, the microcomputer 23D copies the first undesignated data (the first existing data) in the nonvolatile memory 50, and writes the first copied undesignated data into the buffer memory 22. Then, the microcomputer 23D copies record data in the nonvolatile memory 51, and writes the copied record data into the buffer memory 22 in a manner such that the copied record data follows the first copied undesignated data in the buffer memory 22.

During a second stage of the wrong-ECC-block removing process, the microcomputer 23D derives the recording end position LBA1 from the recording start position LBA and the recording size related to the recording number "1". As shown in FIG. 14, the recording end position LBA1 is equal to an LBA of "72". The microcomputer 23D calculates the end address ECC2 of the last ECC block 61 which contains the recording end position LBA1. As shown in FIG. 15, the end address ECC2 of the last ECC block 61 is equal to an LBA of "79". The microcomputer 23D decides whether or not the end address ECC2 of the last ECC block 61 and the recording end position LBA1 are different from each other. When the end address ECC2 of the last ECC block 61 and the recording end position LBA1 are different from each other, it is decided that second undesignated data equal to existing data on disk sectors extending from the position LBA1 to the position ECC2 is stored in the nonvolatile memory 50. In this case, the microcomputer 23D copies the second undesignated data (the second existing data) in the nonvolatile memory 50, and writes the second copied undesignated data into the buffer memory 22 in a manner such that the second copied undesignated data follows the copied record data in the buffer memory 22. Thus, restored data composed of the first copied undesignated data (the first copied existing data), the copied record data, and the second copied undesignated data (the second copied existing data) is prepared in the buffer memory 22. When the end address ECC2 of a last ECC block and a recording end position LBA1 are equal to each other as the case of the recording number "2" in FIGS. 13–15, copying undesignated data (existing data) is not executed.

During a third stage of the wrong-ECC-block removing process, the microcomputer 23D issues a recording command to the communication unit 21. The recording command requires the restored data to be recorded on a region of the disk 2 which extends from the position ECC0 to the position ECC2. The recording command contains information of a designated recording start position LBA equal to the position ECC0, and information of a designated recording size equal to "ECC2–(ECC0+1)". The communication unit 21 transmits the recording command to the disk drive 1. Also, the microcomputer 23D transfers the restored data from the buffer memory 22 to the communication unit 21. The communication unit 21 transmits the restored data to the disk drive 1. In response to the recording command, the disk drive 1 records the restored data on the region of the disk 2 which extends from the position ECC0 to the position ECC2.

A sequence of the above-mentioned steps in the wrong-ECC-block removing process is implemented for each of all the recording numbers, the information of which is stored in the nonvolatile memory 24.

As understood from the previous explanation, a wrong ECC block on the disk 2 which was caused by interruption of power supply can be replaced by a desired normal ECC block in the case where the apparatus in FIG. 11 is restarted after the interruption of power supply terminates. In addition, undesignated data (existing data) in the wrong ECC block can be fully restored.

The nonvolatile memory 51 may be omitted from the apparatus in FIG. 11. In this case, the microcomputer 23D uses predetermined data instead of the record data. For example, all the bits of the predetermined data are "0" in logic state.

The host 20D may issue a reproducing command to the disk drive 1 for each ECC block. In this case, it is preferable that an ECC block is restored only when the reproduction of data from sectors therein is wrong. In the case where an ECC block to be restored contains a recording start position LBA0 or a recording end position LBA1, data stored in the nonvolatile memory 50 may be used as restored data.

Sixth Embodiment

FIG. 16 shows an information recording and reproducing apparatus according to a sixth embodiment of this invention. The apparatus of FIG. 16 is similar to the apparatus of FIG. 1 except for design changes mentioned later. The apparatus of FIG. 16 includes a disk drive 1A, a host 20E, and a microcomputer 23E which replace the disk drive 1, the host 20, and the microcomputer 23 respectively.

The disk drive 1A includes a power interruption detector 12 and an auxiliary power supply (a backup power supply) 13. The power interruption detector 12 is connected to a main controller 11 and also the auxiliary power supply 13. The power interruption detector 12 and the auxiliary power supply 13 are connected to a power supply 30.

The power interruption detector 12 senses interruption of the feed of electric energy from the power supply 30. Specifically, the power interruption detector 12 compares the voltage across the power supply 30 with a predetermined reference voltage. When the voltage across the power supply 30 drops below the predetermined reference voltage, the power interruption detector 12 decides that interruption of power supply occurs. The power interruption detector 12 outputs a signal to the main controller 11 and the auxiliary power supply 13 which represents whether or not interruption of power supply occurs.

The auxiliary power supply 13 receives electric energy from the power supply 30. The auxiliary power supply 13 includes a rechargeable battery or a capacitor. Alternatively, the auxiliary power supply 13 may include a dry battery. When the output signal of the power interruption detector 12 represents that interruption of power supply occurs, the auxiliary power supply 13 feeds electric power to the disk drive 1A to maintain operation thereof.

During a recording mode of operation of the apparatus in FIG. 16, the host 20E transmits a recording command and also record data to the disk drive 1A. In the disk drive 1A, the record data is stored into a cache memory 9. A recording controller 5 and the cache memory 9 are controlled by the main controller 11 so that the record data is transferred from the cache memory 9 onto a position of a disk 2 which is designated by the recording command.

It is assumed that power supply is interrupted during the recording mode of operation of the apparatus in FIG. 16. In this case, the signal outputted from the power interruption detector 12 to the main controller 11 and the auxiliary power supply 13 represents that interruption of power supply occurs. The auxiliary power supply 13 feeds electric power to the disk drive 1A in response to the output signal of the power interruption detector 12.

As a result, the disk drive 1A maintains its operation. Thus, the disk drive 1A continues the recording of data into the present ECC block on the disk 2. In the case where the recording of data into the present ECC block on the disk 2 has been completed after the main controller 11 is informed by the power interruption detector 12 that the interruption of power supply occurs, the main controller 11 forces the recording controller 5 to suspend the data recording process and hence to prevent the recording of data into a new ECC block on the disk 2. Thus, it is possible to prevent a wrong ECC block from occurring on the disk 2 even when power supply is interrupted.

The main controller 11 and the auxiliary power supply 13 may be designed to maintain operation of the disk drive 1 until all data will be transferred from the cache memory 9 onto the disk 2.

What is claimed is:

1. A method of recording and reproducing information on and from a disk ECC-block by ECC-block, every ECC block being composed of plural sectors, the method comprising the steps of:

generating a recording command containing information of a recording position on the disk;

storing the information of the recording position into a nonvolatile memory;

recording data on the disk in response to the recording command;

in cases where power supply is turned on after interruption of power supply terminates, detecting a specified ECC block from the information stored in the nonvolatile memory, the specified ECC block being adversely affected by the interruption of power supply during the recording of data on the disk;

generating one of a reproducing command and a verify command for at least one sector of the specified ECC block;

reproducing data from the specified ECC block on the disk in response to the one of the reproducing command and the verify command;

deciding whether or not the reproduction of data from the specified ECC block succeeds or fails; and in cases where it is decided that the reproduction of data from the specified ECC block fails, recording data on a whole of the specified ECC block to convert the specified ECC block into a normal ECC block.

2. A method of recording and reproducing information on and from a disk ECC-block by ECC-block, every ECC block being composed of plural sectors, the method comprising the steps of:

generating a recording command for a specified ECC block on the disk, the recording command containing information of a recording position on the disk and information of a recording size, the specified ECC block having sectors designated by the recording command and sectors undesignated by the recording command;

writing the information of the recording position and the information of the recording size into a first nonvolatile memory;

calculating the undesignated sectors among sectors in the specified ECC block;

reproducing existing data from the calculated undesignated sectors in the specified ECC block on the disk;

writing the reproduced existing data into a second nonvolatile memory;

recording record data on the designated sectors in the specified ECC block on the disk in response to the recording command;

writing the record data into a third nonvolatile memory; and in cases where power supply is turned on after interruption of power supply terminates, combining the existing data in the second nonvolatile memory and the record data in the third nonvolatile memory into restored data and recording the restored data on a whole of the specified ECC block on the disk in response to the information of the recording position and the information of the recording size in the first nonvolatile memory.

3. A method of recording and reproducing information on and from a disk ECC-block by ECC-block, comprising the steps of:

recording disk identification information on a specified position on a disk;

writing the disk identification information and information of the specified position into a nonvolatile memory;

in cases where power supply is turned on after interruption of power supply terminates, reproducing information from a position on a disk which corresponds to the specified position represented by the information in the nonvolatile memory;

deciding whether or not the reproduced information and the disk identification information in the nonvolatile memory are equal to each other; and when it is decided that the reproduced information and the disk identification information in the nonvolatile memory are equal to each other, updating a wrong ECC block on the disk into a normal ECC block, the wrong ECC block being caused by the interruption of power supply during data recording on the disk.

4. An apparatus for recording and reproducing information on and from a disk ECC-block by ECC-block, every ECC block being composed of plural sectors, the apparatus comprising:

means for generating a recording command containing information of a recording position on the disk;

a nonvolatile memory;

means for storing the information of the recording position into the nonvolatile memory;

means for recording data on the disk in response to the recording command;

means for, in cases where power supply is turned on after interruption of power supply terminates, detecting a specified ECC block from the information stored in the nonvolatile memory, the specified ECC block being adversely affected by the interruption of power supply during the recording of data on the disk;

means for generating one of a reproducing command and a verify command for at least one sector of the specified ECC block;

means for reproducing data from the specified ECC block on the disk in response to the one of the reproducing command and the verify command;

means for deciding whether or not the reproduction of data from the specified ECC block succeeds or fails; and means for, in cases where it is decided that the reproduction of data from the specified ECC block fails, recording data on a whole of the specified ECC block to convert the specified ECC block into a normal ECC block.

5. An apparatus for recording and reproducing information on and from a disk ECC-block by ECC-block, every ECC block being composed of plural sectors, the apparatus comprising:

means for generating a recording command for a specified ECC block on the disk, the recording command containing information of a recording position on the disk and information of a recording size, the specified ECC block having sectors designated by the recording command and sectors undesignated by the recording command;

a first nonvolatile memory;

means for writing the information of the recording position and the information of the recording size into the first nonvolatile memory;

means for calculating the undesignated sectors among sectors in the specified ECC block;

means for reproducing existing data from the calculated undesignated sectors in the specified ECC block on the disk;

a second nonvolatile memory;

means for writing the reproduced existing data into the second nonvolatile memory;

means for recording record data on the designated sectors in the specified ECC block on the disk in response to the recording command;

a third nonvolatile memory;

means for writing the record data into the third nonvolatile memory; and means for, in cases where power supply is turned on after interruption of power supply terminates, combining the existing data in the second nonvolatile memory and the record data in the third nonvolatile memory into restored data and recording the restored data on a whole of the specified ECC block on the disk in response to the information of the recording position and the information of the recording size in the first nonvolatile memory.

6. An apparatus for recording and reproducing information on and from a disk ECC-block by ECC-block, comprising:

means for recording disk identification information on a specified position on a disk;

a nonvolatile memory;

means for writing the disk identification information and information of the specified position into the nonvolatile memory;

means for, in cases where power supply is turned on after interruption of power supply terminates, reproducing information from a position on a disk which corresponds to the specified position represented by the information in the nonvolatile memory;

means for deciding whether or not the reproduced information and the disk identification information in the nonvolatile memory are equal to each other; and means for, when it is decided that the reproduced information and the disk identification information in the nonvolatile memory are equal to each other, updating a wrong ECC block on the disk into a normal ECC block, the wrong ECC block being caused by the interruption of power supply during data recording on the disk.

* * * * *